United States Patent
Negahdar

(10) Patent No.: US 8,577,041 B2
(45) Date of Patent: Nov. 5, 2013

(54) METHOD FOR SECURELY DISTRIBUTING CONFIGURATION INFORMATION TO A DEVICE

(75) Inventor: Ali Negahdar, Suwanee, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1676 days.

(21) Appl. No.: 11/348,887

(22) Filed: Feb. 7, 2006

(65) Prior Publication Data

US 2006/0182282 A1    Aug. 17, 2006

Related U.S. Application Data

(60) Provisional application No. 60/651,039, filed on Feb. 7, 2005.

(51) Int. Cl.
*H04L 29/06* (2006.01)
(52) U.S. Cl.
USPC .......................................................... 380/277
(58) Field of Classification Search
USPC ................... 380/277, 278, 279; 726/22, 14; 713/167, 168, 193, 200, 201; 709/220, 709/222, 228, 229, 234, 243
See application file for complete search history.

(56) References Cited

U.S. PATENT DOCUMENTS

| | | | |
|---|---|---|---|
| 6,570,869 B1 * | 5/2003 | Shankar et al. | 370/352 |
| 6,918,038 B1 * | 7/2005 | Smith et al. | 726/22 |
| 2001/0020274 A1 * | 9/2001 | Shambroom | 713/201 |
| 2001/0029581 A1 * | 10/2001 | Knauft | 713/193 |
| 2001/0033583 A1 * | 10/2001 | Rabenko et al. | 370/503 |
| 2002/0006137 A1 * | 1/2002 | Rabenko et al. | 370/466 |
| 2002/0013899 A1 * | 1/2002 | Faul | 713/156 |
| 2002/0025046 A1 * | 2/2002 | Lin | 380/282 |
| 2002/0026581 A1 * | 2/2002 | Matsuyama et al. | 713/168 |
| 2002/0029268 A1 * | 3/2002 | Baca et al. | 709/224 |
| 2002/0049655 A1 * | 4/2002 | Bennett et al. | 705/35 |
| 2003/0021416 A1 * | 1/2003 | Brown et al. | 380/277 |
| 2003/0070080 A1 * | 4/2003 | Rosen | 713/187 |
| 2003/0220915 A1 * | 11/2003 | Fagan et al. | 707/3 |
| 2005/0201318 A1 * | 9/2005 | Little | 370/321 |
| 2006/0039559 A1 * | 2/2006 | Wasilewski | 380/228 |
| 2006/0174018 A1 * | 8/2006 | Zhu et al. | 709/229 |
| 2007/0283151 A1 * | 12/2007 | Nakano et al. | 713/168 |

OTHER PUBLICATIONS

Innomedia MTA 3328R v.0.6 dated Apr. 2004.*
Packetcable MTA Device Provisioning Specification PKT-SP-PROV-I10-040730 Jul. 30, 2004; by CableLabs.*
http://technet.microsoft.com/en-us/library/cc302649.aspx Microsoft Technet Digital Certificates for ISA Server 2004.*

* cited by examiner

*Primary Examiner* — William Goodchild
(74) *Attorney, Agent, or Firm* — Troy A. Van Aacken

(57) ABSTRACT

An MTA certificate containing a public key is provided to a provisioning server, typically via an MIB. The provisioning server retrieves configuration information associated with the MTA. A symmetric session key is randomly generated and used to encrypt the configuration information. The public key is used to encrypt the symmetric key. The encrypted session key is combined with the encrypted configuration information into a composite file, and the composite file is distributed to the device that contains the MTA.

The MTA device decrypts the session key using its private key that corresponds to the public key and the decrypted session key is used to decrypt the configuration information. The decrypted configuration information is used to complete initialization of the MTA device.

21 Claims, 4 Drawing Sheets

METHOD FOR SECURELY DISTRIBUTING CONFIGURATION INFORMATION TO A DEVICE

CROSS REFERENCE TO RELATED APPLICATION

This application claims priority under 35 U.S.C. 119(e) to U.S. provisional patent application No. 60/651,039 entitled "SIP-based EMTA," which was filed Feb. 7, 2005, and is incorporated herein by reference in its entirety.

FIELD OF THE INVENTION

This invention relates, generally, to communication networks and devices and, more particularly, to protecting configuration file information during distribution to a user device over a non-secure protocol.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

An MSO may use what is known in the art as PacketCable for providing telephony services to users. PacketCable™, which is a trademark of CableLabs®, facilitates the presentation of a transparent interface to a user with respect to operation of the network. In other words, a user plugs a standard telephone into a user device, which presents to the telephone what appears to be a traditional plain old telephony service ("POTS") line card interface. However, the user device transforms analog POTS signals to and from the telephone from/to internet packets.

Such a user device typically includes a media terminal adaptor ("MTA") that performs processing of signals between the telephone and the network interface portions of the user device. When a user device, such as one containing an MTA, performs processing of telephony signals for transport over a network according to PacketCable, secure provisioning of the MTA device is performed according to procedures set forth in the PacketCable specification. Such secure provisioning ensures that the device securely receives information that allows it to confirm with the network that it is the device it purports to be. Transporting of the user device configuration data as specified in the PacketCable specification is typically performed securely according to protocols and procedures that prevent unauthorized access to information related to the user device and associated user.

However, some MSOs, which may operate a DOCSIS network for communicating data over a communication network, may want to provide telephony services over the same network without conforming to the PacketCable specification related to device security. A user device attempting to register with the provisioning server must demonstrate to the provisioning server that it is authorized to do so before a configuration file is sent to the user device attempting to register. For example, PacketCable specifies the use of Kerberized Key Management, in combination with SNMPv3 to secure the device provisioning process. Kerberized Key Management is familiar to those skilled in the art. For further definition of terms and the requirements of PacketCable MTA security requirements, the reader may refer to section 5 of *PacketCable™ MTA Device Provisioning Specification*. This document has document number PKT-SP-PROV-I11-.050812, which may be found at http://www.packetcable.com/downloads/specs/PKT-SP-PROV-I11-050812.pdf, is referred to elsewhere herein as PacketCable sec. 5, and is incorporated herein by reference in its entirety for purposes of providing background information.

For a variety of reasons, an MSO may not wish to implement secure provisioning according to PacketCable sec 5, or later versions thereof. These reasons may include, but are not limited to, reluctance or inability to purchase network equipment required to implement the PacketCable sec. 5 specified security procedures. Another reason may be that that an MSO may encounter difficulty in integrating existing equipment used in providing telephony according to PacketCable with the network equipment required for providing secure provisioning according to PacketCable sec. 5.

An operator may, for example, wish to establish a session initiation protocol ("SIP") communication session without using the PacketCable method for securely transmitting configuration information to a user device. To authenticate a user device in a SIP session, a password is sent from the user device to a provisioning server. However, before the device sends the password to the provisioning server, the password should be provided to the user device such that it is not susceptible to being discovered by other entities. As discussed above, the operator may not want to use the PacketCable-specified method for securely transmitting confidential information to the user device.

Thus, there is a need in the art for a method and system for securely distributing information used to initialize a user device according to PacketCable in general, but not in accordance with PacketCable-specified security, an example of which is described in PacketCable sec. 5, as discussed above.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
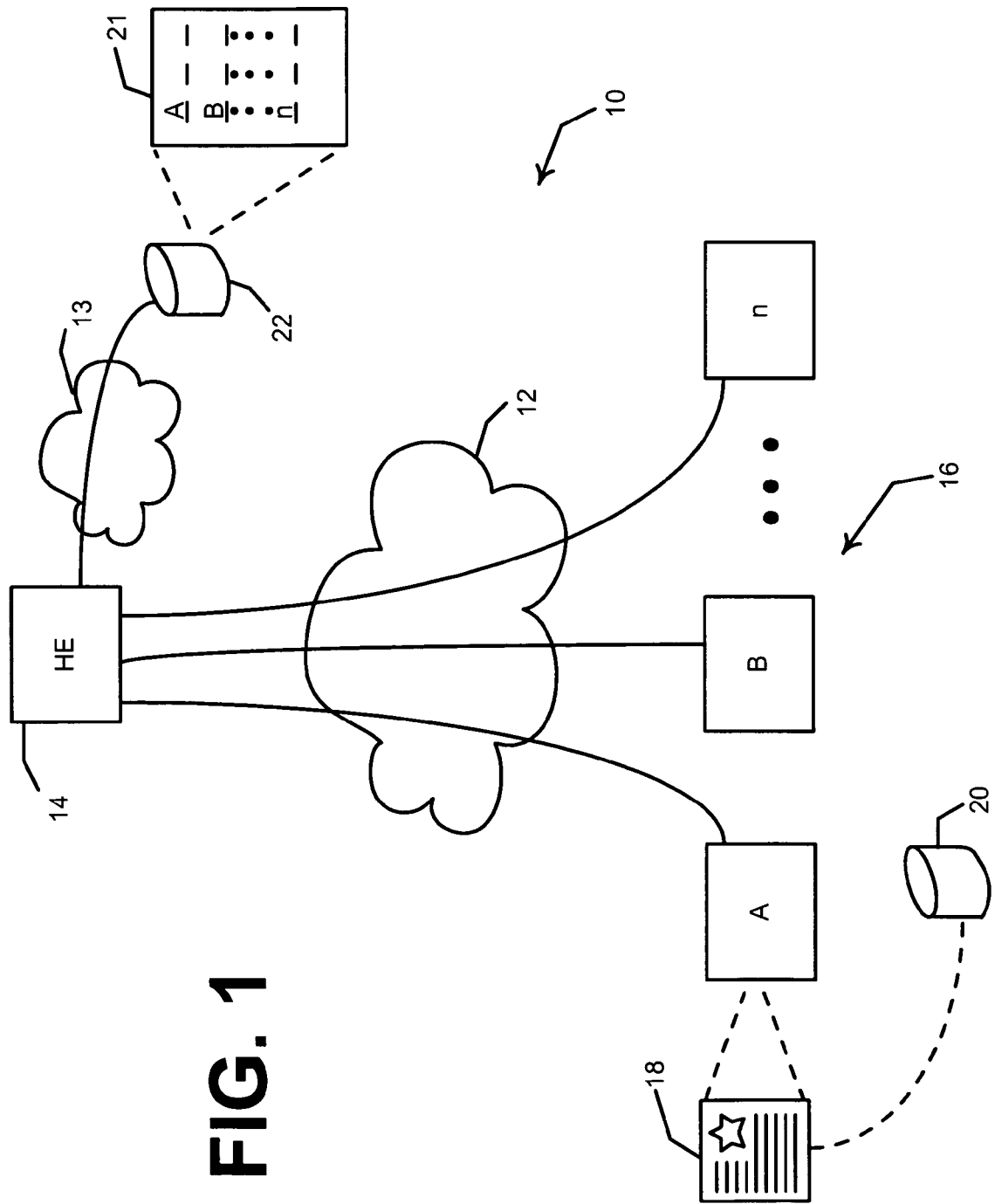
FIG. 1 illustrates a system for providing communication over a network.

Turning to FIG. 1, a system 10 for facilitating communication over a communication network 12 is shown. Network 12 may be one of a variety of network types. Network 12 typically includes an HFC network for communication between user devices and a CMTS. Network 13 typically may include one or more IP networks that couple back-end office equipment, call servers and provisioning servers, for example, to the CMTS. Over network 12, head end 14 and user devices 16 are coupled together for communication there between. Networks 12 and 13 may collectively be referred to as an MSO's network, since a particular service provider typically couples its CMTS to networks 12 and 13.

It will be appreciated that network 13 may include an IP network for example, that may be public, and thus not under the control of a given MSO, and another one or more networks that may be private. However, for clarity, only one symbolic cloud is shown to represent network 13. It will be appreciated that use of the term head end herein generally refers to equipment at a service provider's central location. Equipment located at a head end typically includes a cable modem termination system ("CMTS") for data services, interfaces to other networks and often video servers and satellite dish antennas for receiving video programming. Thus, the term head end as used herein in reference to head end 14 refers to a location owned by a service operator having centralized equipment for providing services.

When each user device 16 is manufactured, information, typically referred to as a certificate 18, is permanently embedded into the non-volatile RAM. This certificate information 18 may become part of a management information base ("MIB") 20 that is created when each device 16 is initialized. Each of devices 16 may contain, for example, a media terminal adaptor ("MTA") or an embedded MTA ("EMTA"). Information in each certificate 18 is used to protect a configuration file during its distribution to a device 16. The configuration file is retrieved from configuration file database 21 stored on provisioning server 22, which is typically coupled to head end 14 via network 13. The configuration file is used by devices 16 while being initialized for operation with an MSO's network. It will be appreciated that provisioning server 22 may be located at the head end 14, or located at another location and be coupled to the head end.

Figure 2:
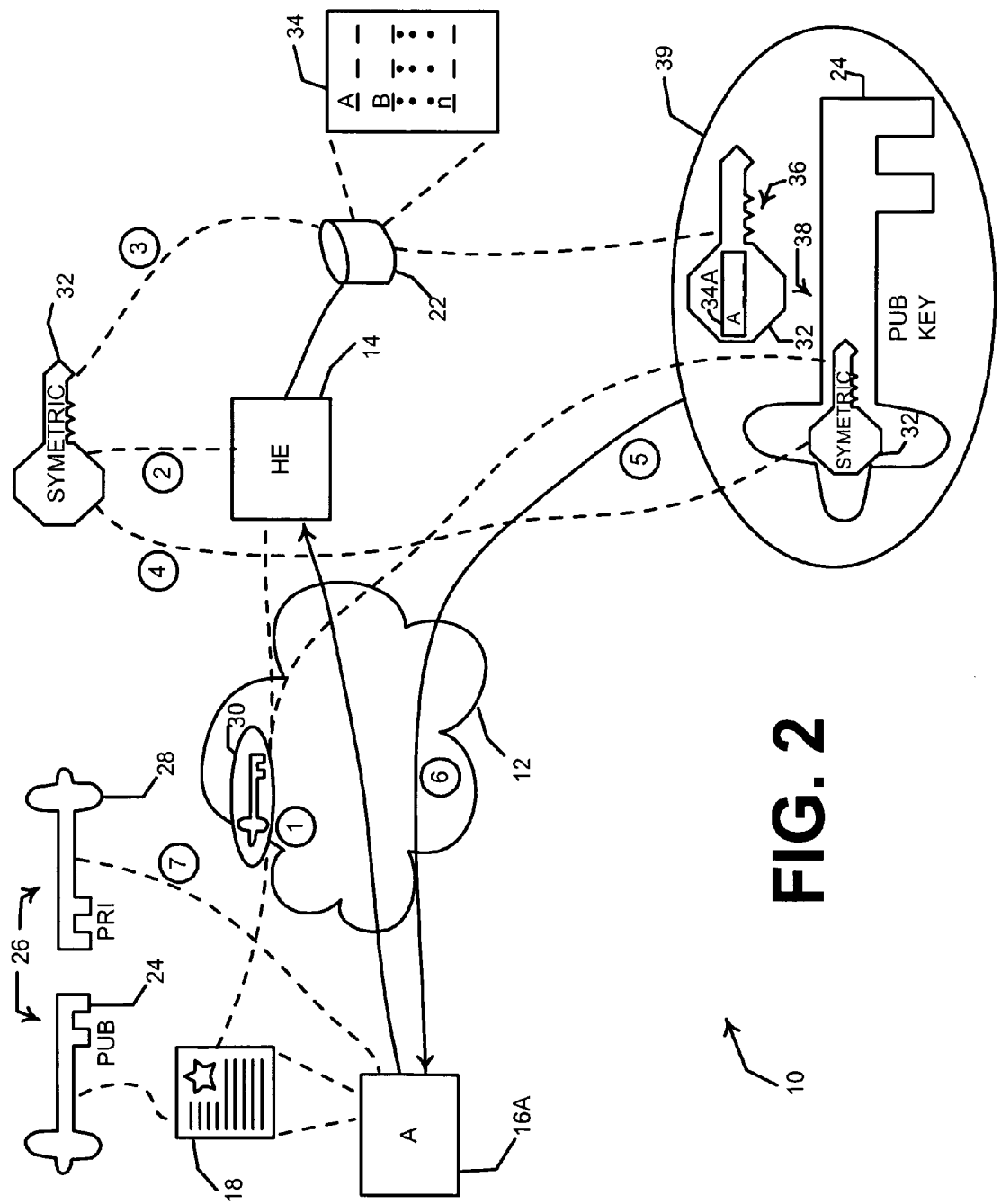
FIG. 2 illustrates a system and method for securely distributing a configuration file to a MTA device.

Turning now to FIG. 2, system 10 is illustrated showing some major process steps of securely transporting configuration file 34A from database 34 to an MTA user device 16A. As part of registration, device 16A sends its device certificate 18 to provisioning server 14. Information from certificate 18 that is sent to provisioning server 22 at head end 14 includes public key 24 that is part of public/private key pair 26. As discussed above, it will be appreciated that the term head end may be referred to in the art as the CMTS in the context of providing DOCSIS data services. However, the MTA device does not communicate with the CMTS when communicating with provisioning server 22 and sending certificate 18 to the provisioning server. Furthermore, it will be appreciated that use of public/private key pairs is known in the art for securely transmitting information in a network. Therefore, background detail regarding public/private keys is not given here. It is noted that in the figure, the public key 24 points to the right and the private key 28 points to the left, to distinguish them visually in the figure from one another.

In the figure, encircled reference numerals are used to show temporal relationship of some of the steps of the process of securely transmitting configuration. In the first step, a message 30 is sent toward provisioning server 22 at step 1, which is indicated by the encircled reference numeral 1 (one). Message 30 typically contains an MIB object as known in the art. The MIB object typically contains certificate 18, which contains public key 24 as discussed above. It will be appreciated that the preferred method for receiving the certificate of a user device is via message 30 sent over network 12. The public key information from certificate 18 may also be provided to provisioning server 22 via a download from a server based on the MAC address of an MTA device. Alternatively, certificate 18 may be provided to server 22 via a compact disk, DVD or other similar storage means. In addition, device certificate 18 may be extracted when an MSO receives a particular device from the device's manufacturer.

Regardless of how public key 24 is provided to server 22 at head end 14, public key 24 is used to encrypt information to be sent from head end 14 toward user device 16A. The information encrypted by public key 24 may include a randomly generated session key 32. Session key 32 is generated by the provisioning server and is unique from other session keys that may have been generated for other devices, or even for device 16A during another initiation process. Session key 32 is preferably symmetric (also referred to as secret) as opposed to asymmetric, which is a term typically used in the art to describe public/private key pairs.

When symmetric key 32 has been generated at step 2, it is used to encrypt configuration information from configuration database 34 corresponding to device 16A at step 3. Configuration information from database 34 may be extracted from provisioning server 22 based on unique identifier information associated with device 16A, such as for example, MAC address, public key, etc. Encrypted configuration information 36 is shown by the illustration of configuration information 34A inside of session key 32.

After session key 32 has been used to encrypt configuration information 34A corresponding to device 16A, the session key is encrypted at step 4 using public key 24 that was received at step 1. The result is encrypted session key 38, which is shown by the illustration of session key 32 inside of public key 24. Then, encrypted session key 38 and encrypted configuration information 36 are combined into a composite file, or message, 39 at step 5. Composite file/message 39 is then sent to device 16A at step 6. Private key 28 is then used to decrypt the session key at step 7. The decrypted session key is then used to decrypt the configuration information 34A. Finally, configuration information 34A is used to complete initialization and configuration of device 16A for use in system 10. Such use may include conducting telephony calls using network 12.

Figure 3:
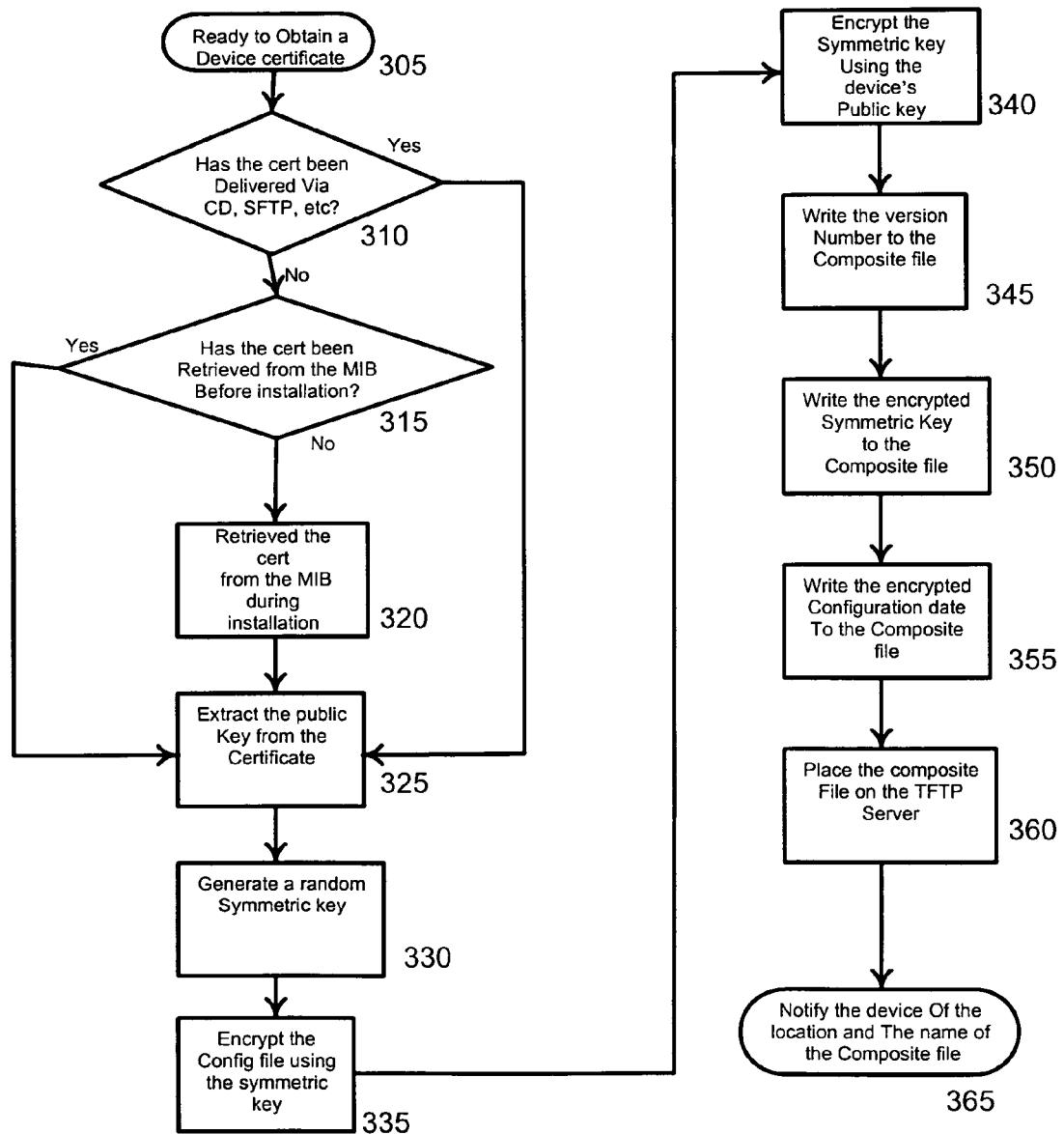
FIG. 3 illustrates a flow diagram of a method for securely distributing configuration information to an MTA device.

Turning now to FIG. 3, a flow diagram is shown that illustrates the steps of a method 300 for distributing configuration information to an MTA at a user device. Method 300 begins at step 305 when a provisioning server is ready to obtain a certificate. Typically, when the provisioning server is coupled to a network and powered up, it is continuously awaiting a request for configuration information from a user device. When a request is received at the provisioning server, the server determines at step 310 whether a certificate has already been delivered that corresponds to the requesting devices. If yes, the method advances to step 325. If a certificate has not already been delivered, such as, for example, via a CD, SFTP, or other means, the method advances to step 315, where a determination is made whether a certificate has been received in an MIB corresponding to the requesting device. If yes, the method advances to step 325. If a certificate has not already been received, method 300 advances to step 320, and a certificate is retrieved from an MIB corresponding to the device requesting configuration information. At step 325, the provisioning server extracts a public key from the certificate.

At step 330, the provisioning server generates a random symmetric session key and configuration information associated with the requesting MTA device is encrypted using the session key at step 335. It will be appreciated that the generation and encrypting of the configuration file information may be performed in an order different from that shown in the figure with respect to steps 310-325.

After the configuration information has been encrypted using the session key, the session key is encrypted with the public key at step 340. At step 345, the version number of the configuration information is written to a composite file. This version number may be used to provide detail to the MTA device as to how information within the composite file is arranged, thus facilitating decrypting and unpacking of the information. At step 350 the encrypted session key is written to the composite file and the encrypted configuration information is written to the composite file at step 355. At step 360, the composite file is made available to the requesting MTA device at a TFTP sever, and the MTA device is notified that the composite file is available at step 365.

Figure 4:
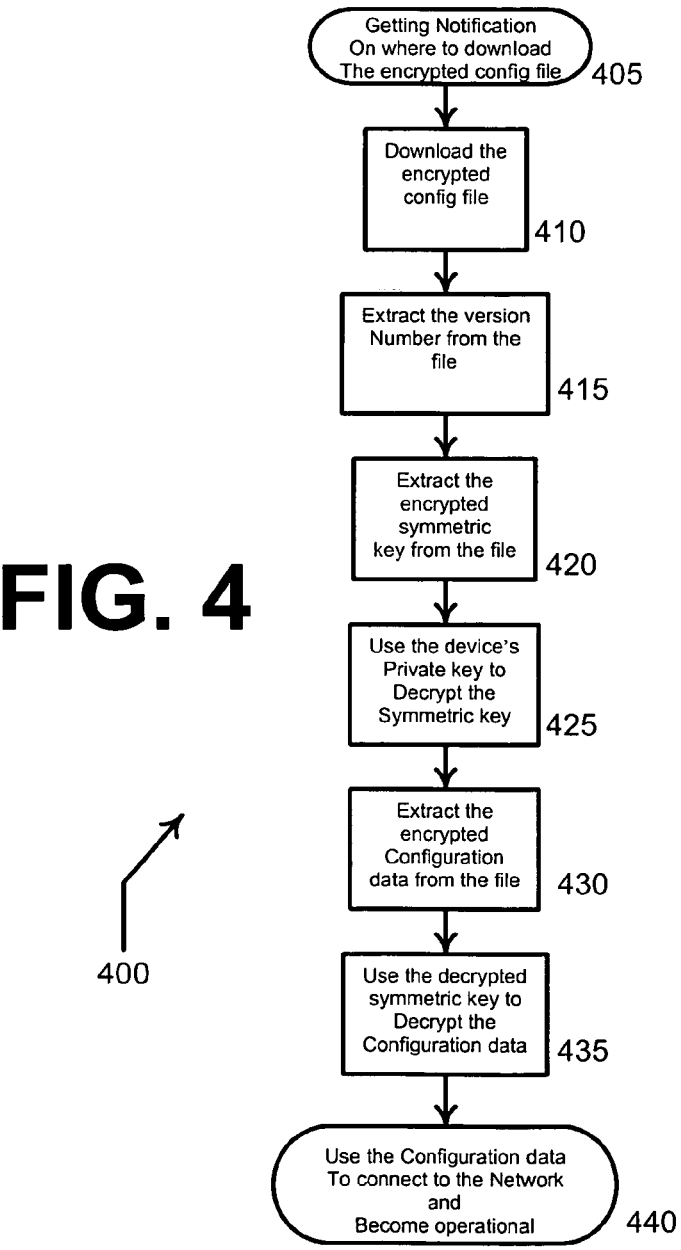
FIG. 4 illustrates a flow diagram of a method for securely decrypting a composite file containing configuration information.

Turning now to FIG. 4, a flow diagram of a method 400 for securely decrypting configuration information at an MTA device is shown. Method 400 begins when a requesting MTA device receives notification that a composite file containing configuration information is available. The composite file is downloaded at step 410. At step 415, the version number is extracted from the composite file and used to refer to a mapping to determine what bytes of the composite file correspond to the encrypted session key and what bytes correspond to the encrypted configuration information.

At step 420, the encrypted session key is extracted based on the mapping referred to by the version number. The MTA devices embedded private key is used to decrypt the session key at step 525. At step 430, and based on the mapping referred to by the version number, the encrypted configuration information is extracted from the composite file. At step 435, the extracted configuration information is decrypted using the already decrypted symmetric session key. At step 440, the MTA device uses the decrypted configuration information to configure itself for connection and operation with the network, and then method 400 ends.

It will be appreciated that the arrangement of bytes within the composite file may change, and the version number of the configuration information refers to said arrangement. Therefore, since the version number is used to determine which remaining bytes in the composite file contain the encrypted configuration information, and which contain the encrypted session key, the version number is placed in the composite file by the provisioning server 'in the clear,' meaning that the version number is not encrypted. A mapping of the arrangement based on version number may be downloaded to the MTA device by the provisioning server, or may be accessible by the MTA but located at the provisioning server. In addition, it will be appreciated that the encrypted session key and encrypted configuration information may include the size of the session key and configuration information, respectively. Also, a non-secret initialization vector may be encrypted with the configuration information.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for protecting the distribution of configuration information to an MTA device for use in a SIP-based network, comprising:
    providing a certificate associated with the MTA device to a provisioning server;
    generating a session key independent of the certificate associated with the MTA device;
    using the session key to encrypt configuration information, the configuration information being used to register the MTA device with a communications network;
    using information contained in the certificate to encrypt the session key; and
    transmitting the encrypted configuration information and the encrypted session key to the MTA device during a registration process to register the MTA device with the communications network using the configuration information.

2. The method of claim 1 wherein the certificate is provided to the provisioning server on an optical disk.

3. The method of claim 1 wherein the certificate is provided to the provisioning server via a download from a server.

4. The method of claim 1 wherein the certificate is provided to the provisioning server before the MTA device is placed into service.

5. The method of claim 1 wherein the information contained in the certificate used for encrypting the session key includes a public key.

6. The method of claim 1 wherein the session key is a symmetric key.

7. The method of claim 1 further comprising combining the encrypted session key and the encrypted configuration information into a composite configuration file.

8. A method for protecting the distribution of configuration information to an MTA device for use in a SIP-based network, comprising:
    providing a certificate associated with the MTA device to a provisioning server;
    generating a random session key;
    encrypting configuration information using the session key;
    encrypting the session key using a public key contained in the certificate;
    combining the encrypted session key and the encrypted configuration information into a composite configuration file;
    transmitting the composite configuration file to the MTA device;
    decrypting the encrypted session key using a private key corresponding to the public key contained in the certificate; and
    decrypting the configuration information using the session key.

9. The method of claim 8 wherein the certificate is provided to the provisioning server on an optical disk.

10. The method of claim 8 wherein the certificate is provided to the provisioning server via an FTP server.

11. The method of claim 8 wherein the certificate is provided to the provisioning server by a multiple services operator before the MTA device is provided to an end user.

12. The method of claim 8 wherein the session key is a symmetric key.

13. The method of claim 8 wherein a version number corresponding to the arrangement of data in the composite file is part of the composite file.

14. A method for protecting the distribution of configuration information to an MTA device for use in a SIP-based network, comprising:
  generating a random session key;
  encrypting configuration information using the session key;
  encrypting the session key using information contained in a certificate that is associated with the MTA device;
  combining the encrypted session key and the encrypted configuration information into a composite configuration file; and
  transmitting the composite configuration file to the MTA device.

15. The method of claim 14 wherein the certificate is provided to the provisioning server on an optical disk.

16. The method of claim 14 wherein the certificate is provided to the provisioning server via an FTP server.

17. The method of claim 14 wherein the certificate is provided to the provisioning server by a multiple services operator before the MTA device is provided to an end user.

18. The method of claim 14 wherein the information contained in the certificate used for encrypting the session key includes a public key.

19. The method of claim 14 wherein the session key is a symmetric key.

20. A method for protecting the distribution of configuration information to an MTA device for use in a SIP-based network, comprising:
  receiving a composite file at the MTA device, the composite file including an encrypted session key and encrypted configuration information;
  decrypting the encrypted session key using a private key securely contained in the MTA device; and
  decrypting the configuration information using the session key;
  using the configuration information to register with a communications network.

21. The method of claim 20 further comprising using a version number that is part of the composite file to determine which portion of the composite file is the encrypted session key.

* * * * *